United States Patent
Gangoli et al.

(10) Patent No.: US 9,134,025 B2
(45) Date of Patent: Sep. 15, 2015

(54) RAPID ENERGY RELEASE BURNERS AND METHODS FOR USING THE SAME

(71) Applicant: Air Products and Chemicals, Inc., Allentown, PA (US)

(72) Inventors: Shailesh Pradeep Gangoli, Easton, PA (US); Aleksandar Georgi Slavejkov, Allentown, PA (US); Jeffrey D. Cole, Nazareth, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 424 days.

(21) Appl. No.: 13/690,492

(22) Filed: Nov. 30, 2012

(65) Prior Publication Data

US 2013/0143168 A1    Jun. 6, 2013

Related U.S. Application Data

(60) Provisional application No. 61/565,560, filed on Dec. 1, 2011.

(51) Int. Cl.
    *F23D 14/58*    (2006.01)
    *F23D 14/22*    (2006.01)
    *F23D 14/32*    (2006.01)

(52) U.S. Cl.
    CPC ............... *F23D 14/58* (2013.01); *F23D 14/22* (2013.01); *F23D 14/32* (2013.01); *Y02E 20/344* (2013.01)

(58) Field of Classification Search
    CPC ......... F23D 14/58; F23D 14/32; F23D 14/22; Y02E 20/344
    See application file for complete search history.

(56) References Cited

U.S. PATENT DOCUMENTS

| | | | |
|---|---|---|---|
| 3,758,037 A * | 9/1973 | Marion et al. | ............ 239/132.3 |
| 6,866,503 B2 | 3/2005 | Ladharam | |
| 2003/0148236 A1 | 8/2003 | Joshi et al. | |
| 2007/0048679 A1 | 3/2007 | Joshi et al. | |
| 2007/0254251 A1 | 11/2007 | Cao et al. | |

FOREIGN PATENT DOCUMENTS

| | | |
|---|---|---|
| DE | 9403330 U1 | 4/1994 |
| EP | 1335163 A1 | 8/2003 |
| EP | 1443271 A1 | 8/2004 |
| EP | 1531303 A1 | 5/2005 |
| EP | 1612481 A2 | 1/2006 |
| EP | 1850067 A2 | 10/2007 |

OTHER PUBLICATIONS

Charles E. Baukal, Jr., Industrial Burners Handbook, Figure 21.4 of Section 1.4.1, CRC Press 2004, p. 703.

* cited by examiner

*Primary Examiner* — Alfred Basichas
(74) *Attorney, Agent, or Firm* — Larry S. Zelson

(57) ABSTRACT

A burner having a high shape factor nozzle including a nozzle opening having a shape factor from about 10 to about 75, the shape factor being defined as the square of the nozzle perimeter divided by twice the nozzle cross-sectional area, and an annular nozzle surrounding the high shape factor nozzle, wherein the high shape factor nozzle is configured to be supplied with one of a fuel gas and an oxidizer gas, and the annular nozzle is configured to be supplied with the other of a fuel gas and an oxidizer gas. A method of rapid energy release combustion, including supplying a fuel gas and an oxidizer gas to a burner having a high shape factor nozzle and an annular nozzle surrounding the high shape factor nozzle.

19 Claims, 14 Drawing Sheets

Direction of fuel and oxygen flow

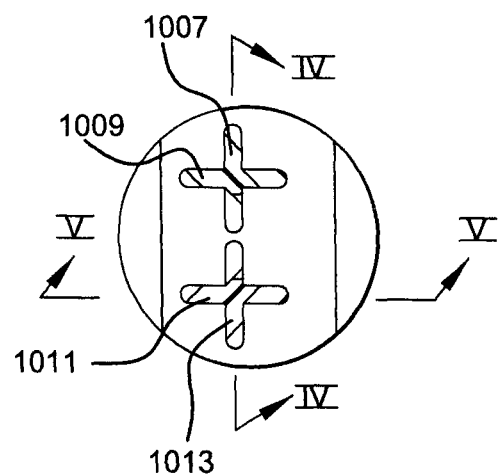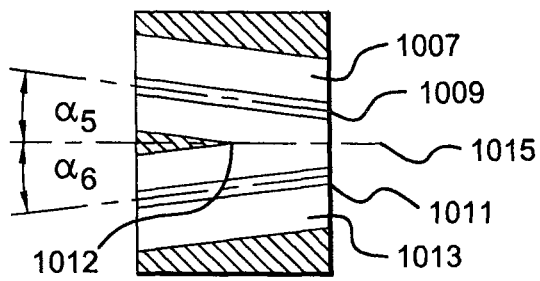
FIG. 12A  FIG. 12B
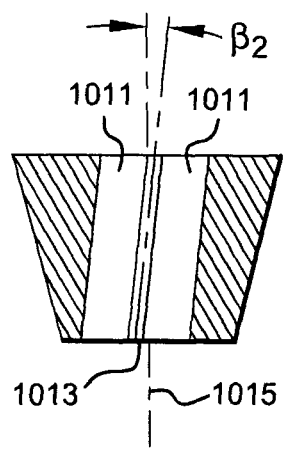
FIG. 12C

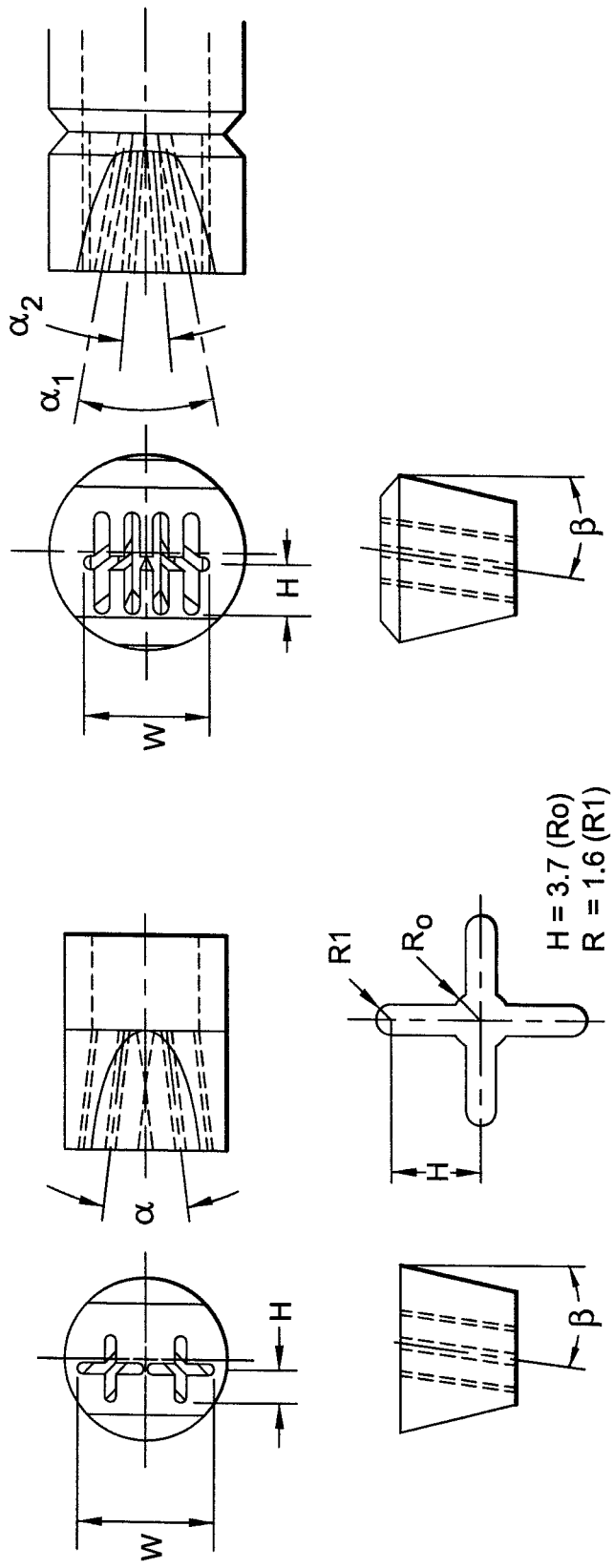

RAPID ENERGY RELEASE BURNERS AND METHODS FOR USING THE SAME

CROSS-REFERENCE TO RELATED APPLICATIONS

This application claims the priority of U.S. Provisional Patent Application No. 61/565,560 filed on Dec. 1, 2011, which is incorporated by reference herein in its entirety. This application is related to application Ser. No. 13/690,709, entitled "STAGED AIR-OXY-FUEL BURNERS AND METHODS FOR USING THE SAME", filed contemporaneously with this Application on Nov. 30, 2012, assigned to the assignee of the present disclosure.

BACKGROUND OF THE INVENTION

The subject matter of this invention relates to an oxy-fuel burner than enables rapid release of combustion energy.

Oxy-fuel burners are used in a wide range of applications. In one application, oxy-fuel burners are employed for melting scrap within a furnace (e.g., in connection with aluminum recycling). In some applications, the charging practice for introducing scrap into the furnace causes the metal to be located relatively close to the face of the burner. When conventional oxy-fuel burner technologies are used, the flame can form a cavity through the scrap, resulting in inefficient heat transfer to the scrap and high flue gas temperatures. In another application, oxy-fuel burners are used in single-pass furnaces where any heat not transferred quickly can be lost out the flue. In yet another application, oxy-fuel burners are fired along the width of a furnace having a large aspect ratio (i.e., length much greater than width), such as shaft furnaces and cupolas, where rapid transfer of combustion heat would significantly improve efficiency of the furnace.

Conventional oxy-fuel burners and methods for using burners for entraining furnace gas into the combustion zone are described in U.S. Pat. No. 6,866,503 B2 and US Pub. No. 2007/0254251 A1, which are hereby incorporated by reference in their entirety. Another conventional burner known as a "pipe-in-pipe" burner is disclosed in FIG. 21.4 of section 21.4.1 of the Industrial Burners Handbook, CRC Press 2004. There is a need in this art for a burner and method that has an enhanced rate of uniform heat release to improve heat transfer efficiency to the furnace and reduce flue gas temperatures.

BRIEF SUMMARY OF THE INVENTION

A rapid energy release burner described herein solves problems associated with conventional burners and methods by including a high shape factor nozzle surrounded by an annular nozzle to enhance mixing between fuel and oxidizer streams. The combination of burner nozzles can also avoid dilution of the combustion zone, thereby enabling rapid release of combustion energy.

In one aspect, the burner employs a recessed central nozzle. In another aspect of the invention, the burner produces a flame that is relatively voluminous in comparison to conventional flames. As a result, the burner can uniformly heat a charge within a furnace and provide a peak heat flux relatively close to the face of the burner.

One aspect of the invention relates to a burner comprising at least one nozzle having a shape factor of greater than about 10 and an annular nozzle surrounding the at least one nozzle. In one aspect the burner comprises a plurality of high shape factor nozzles that are surrounded by the annular nozzle.

In one embodiment, a burner is provided including a high shape factor nozzle and an annular nozzle. The high shape factor nozzle includes a nozzle body and a nozzle opening having a shape factor from about 10 to about 75, the shape factor being defined as the square of the nozzle perimeter divided by twice the nozzle cross-sectional area. The annular nozzle surrounds the high shape factor nozzle. The high shape factor nozzle is configured to be supplied with one of a fuel gas and an oxidizer gas, and the annular nozzle is configured to be supplied with the other of a fuel gas and an oxidizer gas.

In one aspect, the high shape factor nozzle may taper narrower toward the nozzle opening. Two tapered faces, symmetrically positioned on the nozzle body, taper inward, each at an angle of about 15° to about 30° with respect to an axis of the burner. The high shape factor nozzle has a cross-sectional area and an outlet face with an area from about 35% to about 70% of the cross-sectional area.

In another aspect, the annular nozzle has a discharge end, and the high shape factor nozzle may be axially offset from the discharge end by an offset distance. The high shape factor nozzle has a diameter, and in one aspect, the nozzle opening of the high shape factor nozzle is recessed from the discharge end by less than or equal to about one high shape factor nozzle diameter.

In another aspect, an annular nozzle opening is formed between the annular nozzle and the high shape factor nozzle, and the high shape factor nozzle opening and the annular nozzle opening are sized so as to provide a velocity ratio of a gas stream flowing through the annular nozzle to a gas stream flowing through the high shape factor nozzle opening, $V_{ANNULAR}/V_{HSF}$, of less about 1.

The high shape factor may be centrally positioned within the annular nozzle opening, or may be offset from a central position. More than one high shape factor nozzles may be positioned within the annular nozzle opening.

In another embodiment, a burner is provided having a high shape factor nozzle and an annular nozzle. The high shape factor nozzle includes a nozzle body, an outlet face, and a nozzle opening in the outlet face having a shape factor from about 10 to about 75, the shape factor being defined as the square of the nozzle perimeter divided by twice the nozzle cross-sectional area. The annular nozzle surrounds the high shape factor nozzle and having a discharge end. The high shape factor nozzle is configured to be supplied with one of a fuel gas and an oxidizer gas, and the annular nozzle is configured to be supplied with the other of a fuel gas and an oxidizer gas.

In another embodiment, a method of rapid energy release combustion is provided. The method includes supplying a fuel gas and an oxidizer gas to a burner having a high shape factor nozzle and an annular nozzle surrounding the high shape factor nozzle, directing one of the fuel gas and the oxidizer gas through the high shape factor nozzle, and directing the other of the fuel gas and the oxidizer gas through the annular nozzle. The high shape factor nozzle includes nozzle opening having a shape factor from about 10 to about 75, the shape factor being defined as the square of the nozzle perimeter divided by twice the nozzle cross-sectional area.

In one aspect, the method further includes causing the ratio of the velocity of the gas flowing through the annular nozzle opening to the velocity of the gas flowing through the high shape factor nozzle opening, $V_{ANNULAR}/V_{HSF}$, to be less than about 1.

Another aspect of the invention relates to a method for rapid energy release for heating at least one of aluminum, iron, steel, copper, lead and zinc comprising using the inventive burner.

The various aspects of the invention disclosed herein can be used alone or in combinations with each other.

BRIEF DESCRIPTION OF SEVERAL VIEWS OF THE DRAWINGS

FIG. 12A is a front view of the nozzle body of FIG. 11 showing the discharge end or nozzle of the nozzle body.

FIG. 12B is a cross-sectional view of section IV-IV of FIG. 12A.

FIG. 12C is a cross-sectional view of section V-V of FIG. 12A.

FIG. 13 presents definitions of various geometrical design parameters of the nozzle body of FIGS. 12A, 12B, and 12C.

FIG. 14 presents definitions of various geometrical design parameters of the nozzle body of FIGS. 10A, 10B, and 10C.

DETAILED DESCRIPTION OF THE INVENTION

Figure 1:
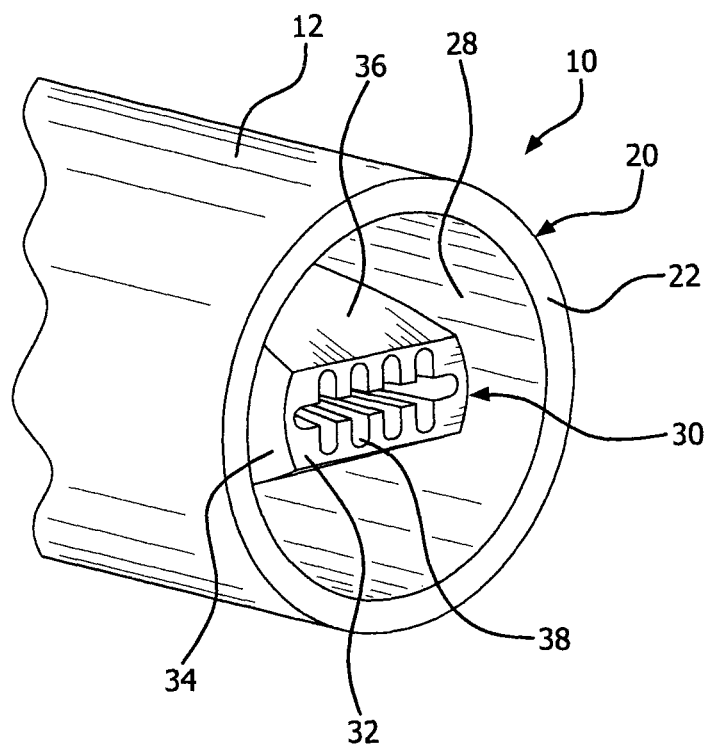
FIG. 1 is a perspective view of a rapid energy release burner including a high shape factor nozzle surrounded by an annular nozzle.

An oxy-fuel burner is described that can facilitate the rapid release of combustion energy into the furnace. This is achieved by special geometrical configurations of fuel and oxidizer nozzles, resulting in a relatively voluminous flame that is capable of heating up a furnace charge more uniformly.

As used herein, the terms "oxidizer" and "oxidant" are used interchangeably to mean a gas having at least about 20.9% vol. % $O_2$, and may have at least about 23 vol. % $O_2$, or at least about 30 vol. % $O_2$, or at least about 60 vol. % $O_2$, or at least about 85 vol. % $O_2$ or about 100% $O_2$. As used herein, "fuel gas" can include any gaseous fuel capable of combusting in an oxidizer or oxidant.

FIGS. 1-3B show an exemplary burner 10 having an outer conduit 12 and an inner conduit 14. The outer conduit 12 terminates in an annular nozzle 20 having a discharge end 22, and the inner conduit 14 terminates in a high shape factor (HSF) nozzle 30. The HSF nozzle 30 includes an outlet face 32 and a nozzle body 34 connected to the inner conduit 14. A nozzle opening 38 is formed in the outlet face 32 of the nozzle 30. An annular nozzle opening 28 is formed between the annular nozzle 20 and the HSF nozzle 30.

An optional igniter 40, as shown in the figures, may be provided for ignition of the burner 10. Spacers 42 may be provided to position the HSF nozzle 30 within the annular nozzle 20. Additionally, a cooling passage 44 may be provided in the outer nozzle 12 to enable flow of a liquid coolant to remove heat from the annular nozzle 20.

During operation of the burner 10, the HSF nozzle 30 is supplied with an inner stream of either fuel gas or oxidant gas by the inner conduit 14, and the annular nozzle 20 is supplied with an outer stream of either fuel gas or oxidant gas by the outer conduit 12. One of fuel gas and oxidizing gas is supplied to the HSF nozzle 30, and the other of fuel gas and oxidizing gas is supplied to the annular nozzle 20. Upon exit from the HSF nozzle 30, the inner stream forms an inner jet of gas that entrains the outer stream of gas. In one embodiment, fuel gas is supplied as the inner stream to the HSF nozzle 30 while oxidant gas is supplied as the outer stream to the annular nozzle 20. In another embodiment, oxidant gas is supplied as the inner stream to the HSF nozzle 30 while fuel gas is supplied as the outer stream to the annular nozzle 20.

As shown in FIGS. 1-3B, the annular nozzle 20 completely surrounds the high shape factor nozzle 30. In one embodiment, the high shape factor nozzle 30 is centrally disposed within the annular nozzle 20 so that the annular nozzle opening 28 is symmetric about the high shape factor nozzle 30. In another embodiment, a plurality of high shape factor nozzles 30 are positioned within the annular nozzle and surrounded by the annular nozzle opening 28.

The high shape factor nozzle discharge opening 38 has a geometry that helps the exiting inner stream produce a large degree of fluid entrainment of the outer stream. In the depicted embodiment, the nozzle 30 can be described as "slotted" or "zippered" in shape. The nozzle opening 38 is characterized by a shape factor, $\sigma$, that is at least about 10, wherein $\sigma$ is a dimensionless parameter defined as $$\sigma = P^2/2A$$

where P is the perimeter of the discharge opening and A is the flow area of the discharge opening. The perimeter dimension is the dimension of the wetted edges of the discharge opening as measured at the plane of the nozzle face where the nozzle discharges into the combustion zone.

The shape factor determines the extent of interaction between the inner jet and the outer surrounding stream. Various geometries may be used to achieve the desired shape factor, $\sigma$, including those shown herein and in U.S. Pat. No. 6,866,503, incorporated herein by reference. As one example, the nozzle 30 shown in the embodiment of FIGS. 1-3, with one central slot and four cross slots, has a shape factor of 41.6.

A similar nozzle with one central slot and three cross slots has a shape factor of about 32.9. By comparison, the shape factor of a conventional circular nozzle is about 6.28 (i.e., 2π). The shape factor for HSF nozzles 30 in a rapid energy release burner 10 as described herein can range from at least about 10 to as large as about 75, and is preferably greater than or equal to about 10, more preferably greater than or equal to about 25, and most preferably greater than or equal to about 35. Thus, the shape factor for the HSF nozzles can be from about 1.5 to about 12 times that of a conventional circular nozzle, and in the exemplary embodiments depicted in FIG. 1-3, the nozzle shape factor is about 6.6 times that of a conventional circular nozzle. Such shape factors have been shown in simulations and testing to be able to obtain a rapid release heat flux profile, as discussed below in further detail with respect to FIGS. 5A and 5B.

The high shape factor nozzle 30 creates low pressure areas or pockets around the perimeter of the nozzle opening 38, and in particular between the slots, which helps to entrain surrounding gases. The inner stream jet (for example, fuel gas) exiting the high shape factor nozzle opening 38 acts to entrain the outer stream (for example, oxidant gas) exiting the annular nozzle opening 28. The shape of the nozzle opening 38 causes the inner stream jet to create turbulence, thereby rapidly mixing the inner and outer streams, and resulting in a bushy high energy release flame. Without wishing to be bound by any theory or explanation, in general the higher the shape factor, the faster the mixing between fuel and oxidizer streams and hence more voluminous the flame is likely to be.

Rapid release of energy can be achieved by enhanced mixing of fuel and oxidizer flows. Several factors, in combination with the use of high shape factor nozzles, can be employed to achieve a rapid heat flux profile. In one aspect, the HSF nozzle 30 can be completely surrounded by the annular nozzle 20. This maximizes the interaction between the fuel gas and oxidant gas streams to promote rapid mixing.

In another aspect, the HSF nozzle 30 can have a tapered shape, as shown in FIG. 3 with the nozzle body 34 of the nozzle 30 having tapered faces 36 that angle inwardly toward the outlet face 32. The angle of taper, φ, can be from about 15° to about 45°, preferably from about 15° to about 30°, and more preferably about 20°. The tapered faces 36 reduce overheating of the nozzle 30 by minimizing recirculation of the outer stream at the outlet face 32. The tapered faces 36 also help streamline the outer stream flowing from the annular nozzle opening 28 into the inner stream or jet exiting the HSF nozzle opening 38. In one aspect, the HSF nozzle 30 has a center plane defined by the nozzle opening 38, and the tapered faces 36 are on opposite sides of the nozzle body 34 and taper inward toward the center plane, such that projections of the opposed faces and the center plane would intersect at a line in the combustion zone beyond the outlet face 32 of the nozzle 30.

Figure 2:
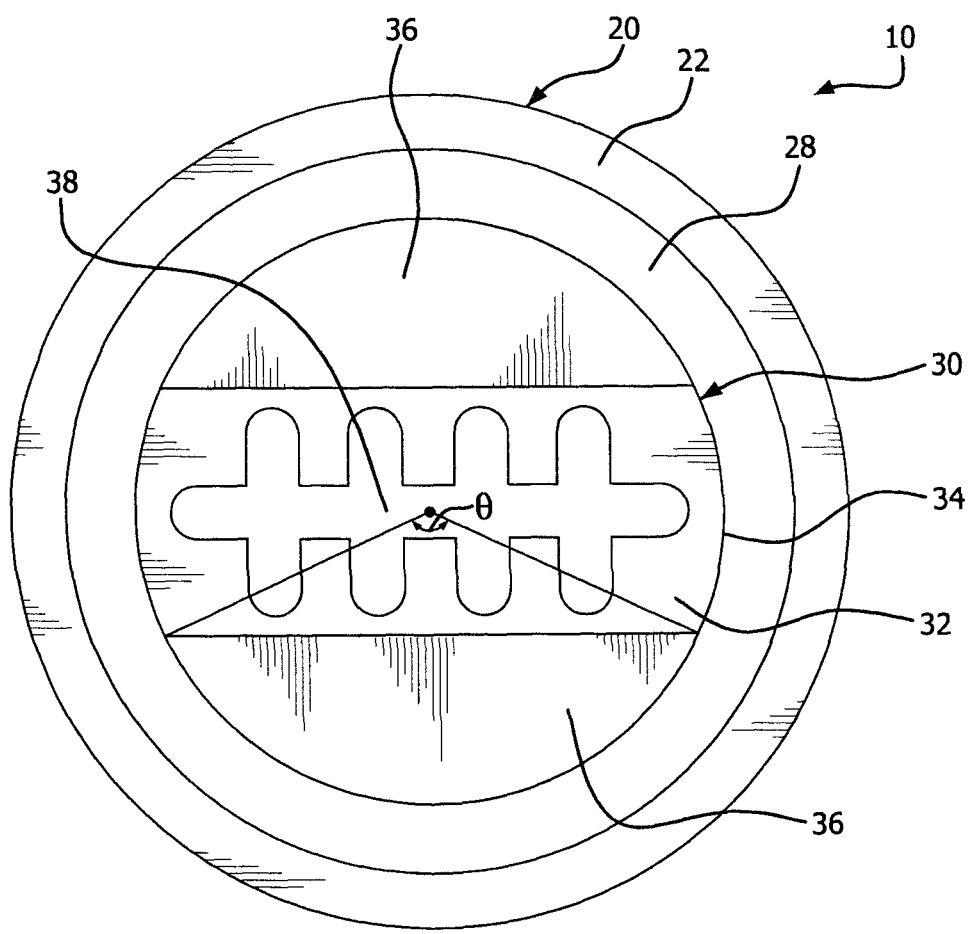
FIG. 2 is an end view of a burner as in FIG. 1.
Figure 3A:
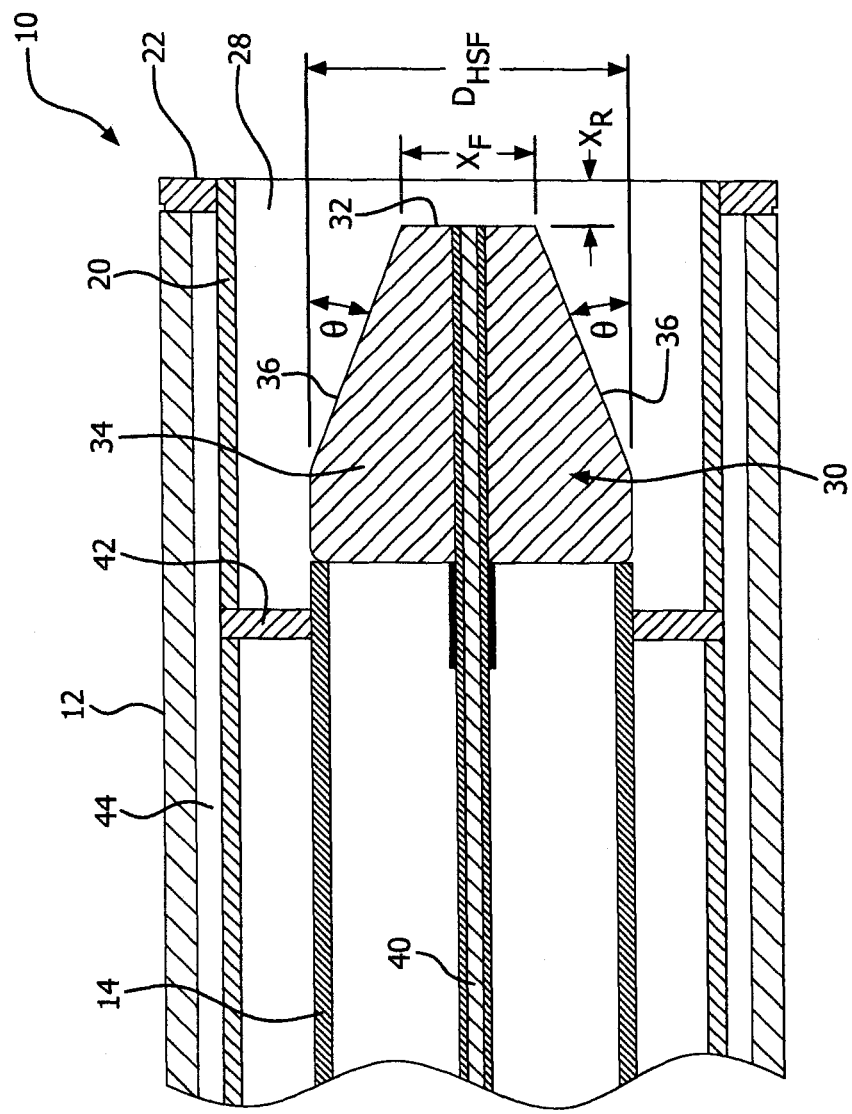
FIG. 3A is a cross-sectional view of a burner as in FIG. 1, taken a vertical section as the nozzle appears in FIG. 2.
Figure 3B:
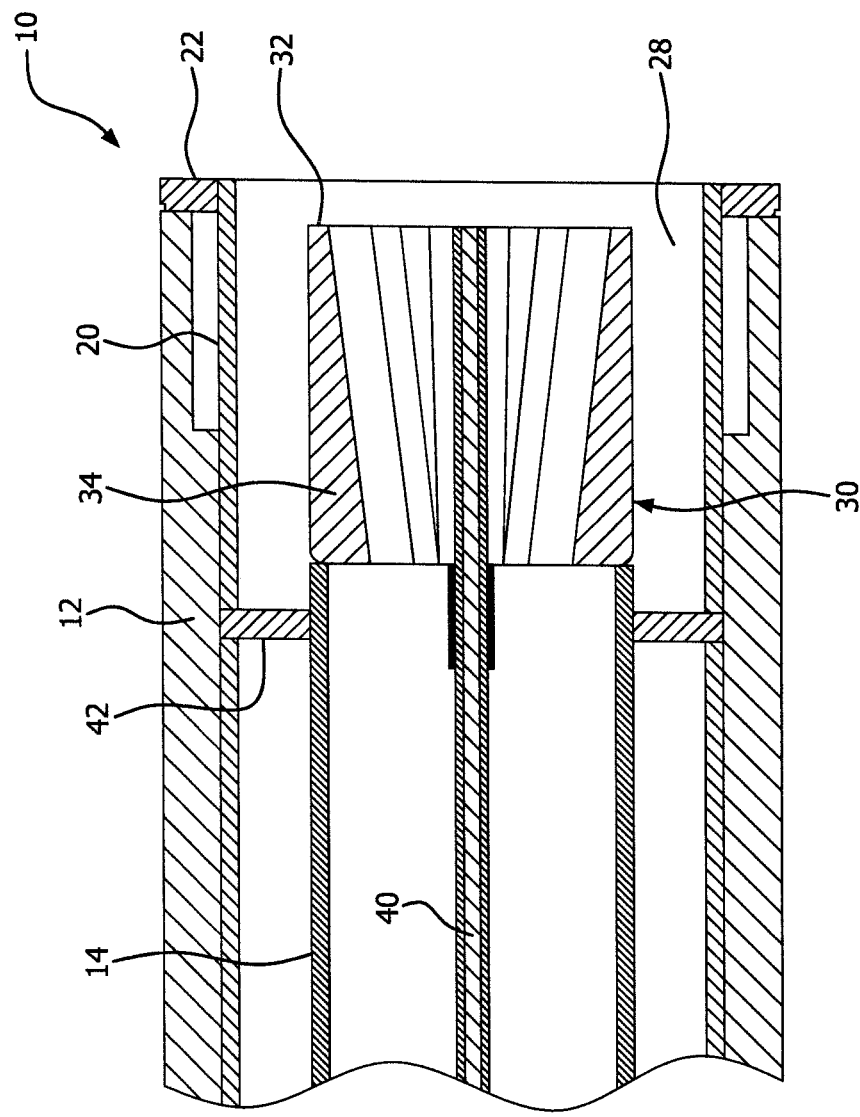
FIG. 3B is a cross-sectional view of a burner as in FIG. 1, taken a horizontal section as the nozzle appears in FIG. 2.

The tapered faces 36 can further be defined by the area ratio of the HSF nozzle outlet face 32 ($A_F$) to the cross-sectional area of the HSF nozzle 30 ($A_N$). As shown in FIGS. 2 and 3A, the HSF nozzle 30 has a diameter $D_{HSF}$ and the outer face 32 has a height $X_F$ that is less than the diameter $D_{HSF}$. From the end view of FIG. 2, it can be seen that the area difference between $A_N$ and $A_F$ is twice the projected area of the circle segments representing the tapered faces 36, each of those circle segments being defined as subsuming an angle θ. Specifically, the HSF nozzle area $A_N$ can be calculated as:

$$A_N = \frac{\pi D_{HSF}^2}{4}$$

while the HSF nozzle outer face area $A_F$ can be calculated as:

$$A_F = \frac{D_{HSF}^2}{4}(\pi - \theta - \sin\theta)$$

where θ=2·arccos($X_F/D_{HSF}$). The area ratio $A_F/A_N$ can be from about 35% to about 70%, which corresponds approximately to an $X_F/D_{HSF}$ range of about 28% to about 59% and a subsumed angle θ range of about 108° to about 147°. In the embodiment depicted in FIGS. 1-3B, the subsumed angle θ is about 132° and the ratio $X_F/D_{HSF}$ is about 41%, resulting in an area ratio $A_F/A_N$ of about 51%.

The tapered shape of the HSF nozzle 30 helps to significantly reduce the surface temperature of the outlet face 32, which is not provided with any external cooling in the described embodiments. Without being bound by theory, it is believed that an HSF nozzle not having tapered faces creates recirculation zones of the annular stream of gas as it passes over the bluff body end of the HSF nozzle. This results in rapid mixing of the fuel gas and oxidant, as well as entrainment of furnaces gases, at the outlet face of the HSF nozzle, which causes the flame so that it is essentially attached to the face of the nozzle on either side of the zipper nozzle opening. In contrast, an HSF nozzle 30 having tapered faces 36 and an area ratio $A_F/A_N$ as described herein enables the annular stream of gas to be streamlined radially inward to be entrained into the inner stream of gas, creating a flame that emanates essentially from the nozzle opening 38. This results in less heat being imparted to the outlet face 32.

Figure 7B:
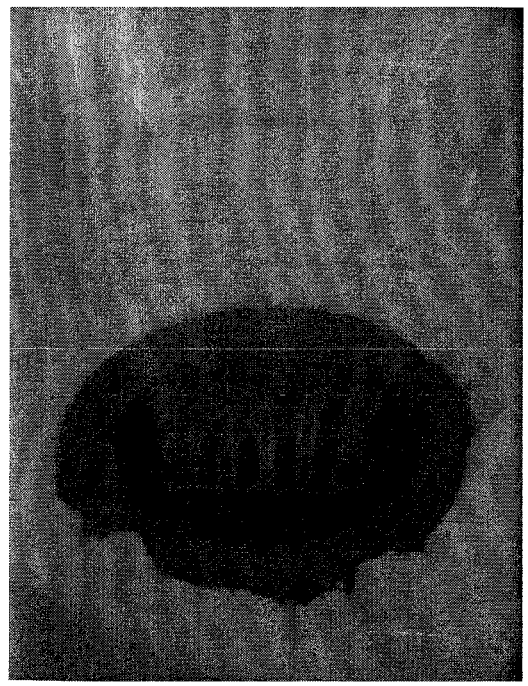
FIGS. 7A and 7B are photographs comparing a flame produced by a high shape factor nozzle with a bluff body tip to a flame produced by a high shape factor nozzle with a tapered tip.
Figure 7A:

FIGS. 7A and 7B compare the flame characteristics of two burners, the burner in FIG. 7A having an HSF nozzle with a bluff body and no tapered faces (i.e., $A_F/A_N=1$) and the burner in FIG. 7B having an HSF nozzle 30 as described herein, with tapered faces 36 and an area ratio $A_F/A_N$ of about 51%. In both cases, fuel gas was flowed through the HSF nozzle 30 while oxidant was flowed through the annular nozzle 20. The burner of FIG. 7A exhibits two distinct flames, one on either side of the HSF nozzle opening 38. The photo of FIG. 7A also shows that the outlet face of the HSF nozzle is being heated to the point where it glows. In contrast, the burner of FIG. 7B exhibits one flame emanating from nozzle opening 38, and the outlet face 32 of the HSF nozzle 30 is much cooler and does not glow.

In yet another aspect, the outlet face 32 of the HSF nozzle 30 can be axially offset from the discharge end 22 of the annular nozzle 20 by an offset distance, $X_R$. The distance $X_R$ can be as large as about ±1 diameter, $D_{HSF}$, of the nozzle 30. That is, the outlet face 32 of the HSF nozzle 30 can be recessed by as much as about one diameter $D_{HSF}$ with respect to the discharge end 22, as indicated in FIG. 3A. Recessing the HSF nozzle 30 helps ensure that the inner gas jet (fuel or oxidizer) exiting the nozzle opening 38 is surrounded entirely by the annular gas stream to be entrained (oxidizer or fuel, respectively) and can avoid dilution of the flame root by furnace gases, without overheating the external annular nozzle 20. Recessing the HSF nozzle 30 also enables the fuel and oxidizer flows to mix prior to entraining furnaces gases, thereby minimizing the dilution of the mixing of fuel and oxidizer flows by the furnace gases at the HSF nozzle 30.

Otherwise, particularly when the fuel gas and/or oxidant have low momentums, dilution could result in delayed mixing of fuel and oxidizer flows.

Alternatively, the outlet face 32 of the HSF nozzle 30 can protrude by as much as about one diameter $D_{HSF}$ beyond the discharge end 22, particularly for a configuration in which the fuel gas and/or oxidant have high momentums. Still alternatively, the outlet face 32 of the HSF nozzle 30 can be approximately flush or aligned with the discharge end 22.

In still another aspect, the flame volume can be controlled by HSF nozzle velocity and by the ratio of the annular stream velocity to the inner jet velocity. Specifically, flame volume can be enhanced by controlling ratio of the velocity of the outer or annular stream ($V_{ANNULAR}$) to the velocity of the inner stream exiting the HSF nozzle ($V_{HSF}$) to be less than about 3. In one embodiment, the velocity of the annular stream is controlled to be less than the velocity of the inner stream exiting the HSF nozzle, i.e., $V_{ANNULAR}/V_{HSF} < 1$. Preferably, the velocity ratio between the annular flow and the inner jet ($V_{ANNULAR}/V_{HSF}$) is about 0.1 to about 1. More preferably, the velocity ratio $V_{ANNULAR}/V_{HSF}$ is approximately 0.3. That is, the inner jet velocity is typically about 30% of the annular flow velocity so that the inner jet entrains the surrounding annular gas flow to create good mixing and, in turn, a relatively voluminous flame. In one example, the inner jet velocity can be less than or equal to about 600 ft/s (e.g., about 100 ft/s to about 300 ft/s), and the annular flow velocity can correspondingly be less than or equal to about 600 ft/s, and preferably less than or equal to about 180 ft/s (e.g., about 30 ft/s to about 90 ft/s).

In a further aspect, the slots of the HSF nozzle 30 can have an expansion angle (described below in more detail with reference to FIGS. 9 and 11), in order to mix effectively with the annular stream and to generate a "bushy" flame to enhance radial coverage of the flame.

Figure 8:
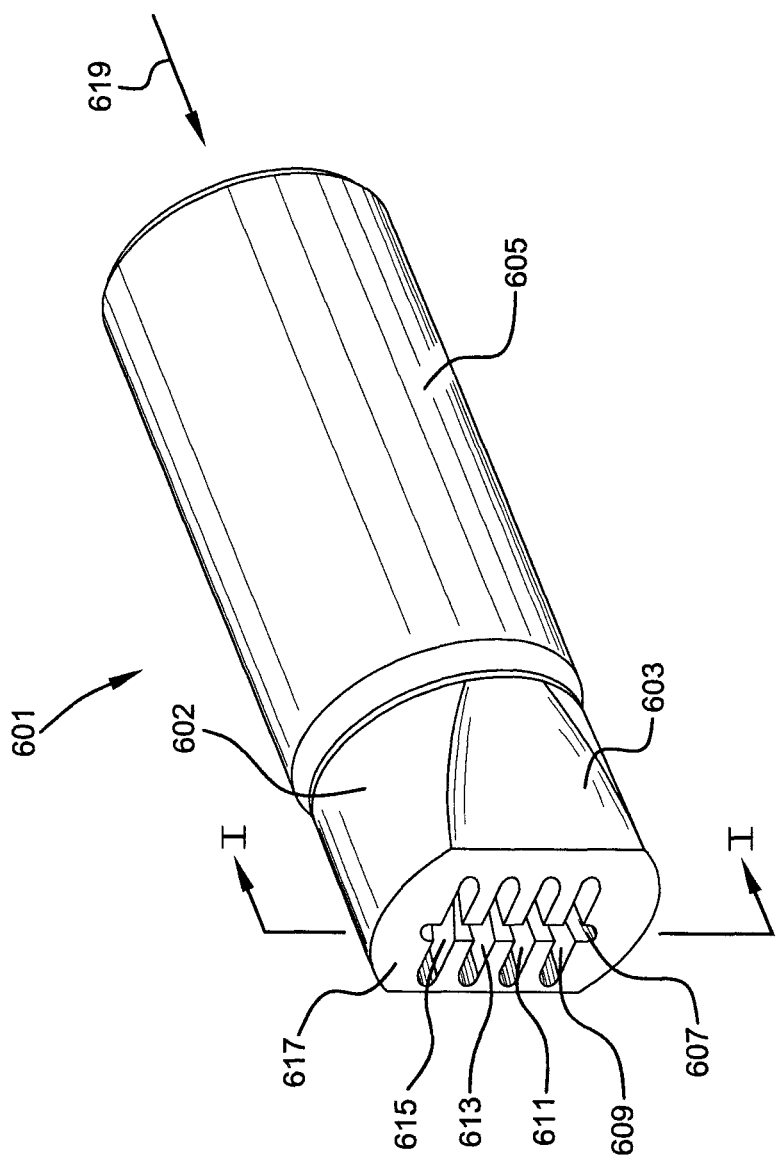
FIG. 8 is a perspective view of a high shape factor nozzle assembly for use in a rapid energy release burner.

Shapes and designs of nozzles suitable for use in the embodiments described above are described in U.S. Pat. No. 6,866,503 B2, which is incorporated herein by reference. One of these nozzle designs is illustrated in FIG. 8. A nozzle assembly 601 comprises a nozzle body 602 having tapered faces 603 and an outlet face 617, the nozzle body 602 being joined to nozzle inlet conduit or pipe 605. The nozzle assembly 601 is analogous to the HSF nozzle 30 described with reference to FIGS. 1-3B. A central slot 607, illustrated here as vertically-oriented, is intersected by cross slots 609, 611, 613, and 615. As described in detail below, the lengthwise direction of the central slot 607 (i.e., the major axis) defines a central plane extending perpendicularly outward from the outlet face 617. The slots are disposed between the outlet face 617 and an inlet face (not shown) at the connection between the nozzle body 603 and the nozzle inlet pipe 605. A first gas (one of fuel and oxygen) 619 flows through the nozzle inlet pipe 605 and through the slots 607, 609, 611, 613, and 615, and then mixes with a second gas (the other of fuel and oxygen) flowing in the annular stream surrounding the slot outlets. The opening formed by slots 607, 609, 611, 613, and 615 forms the HSF nozzle 30 as earlier described.

In addition to the slot pattern shown in FIG. 8, other slot patterns are possible as described later. Also, the nozzle 601 assembly can be used in any orientation and is not limited to the generally horizontal orientation shown. In the depicted exemplary embodiment, when viewed in a direction perpendicular to outlet face 617, exemplary slots 609, 611, 613, and 615 intersect slot 607 at right angles. Other angles of intersection are possible between exemplary slots 609, 611, 613, and 615 and slot 607. Similarly, when viewed in a direction perpendicular to outlet face 617, exemplary slots 609, 611, 613, and 615 are parallel to one another; however, other embodiments are possible in which one or more of these slots are not parallel to the remaining slots.

The term "slot" as used herein is defined as an opening through a nozzle body or other solid material wherein any slot cross-section (i.e., a section perpendicular to the inlet flow axis defined below) is non-circular and is characterized by a major axis and a minor axis. The major axis is longer than the minor axis and the two axes are generally perpendicular. For example, the major cross-section axis of any slot in FIG. 8 extends between the two ends of the slot cross-section; the minor cross-section axis is perpendicular to the major axis and extends between the sides of the slot cross-section. The slot may have a cross-section of any non-circular shape and each cross-section may be characterized by a center point or centroid, where centroid has the usual geometric definition.

A slot may be further characterized by a slot axis defined as a straight line connecting the centroids of all slot cross-sections. In addition, a slot may be characterized or defined by a center plane which intersects the major cross-section axes of all slot cross-sections. Each slot cross-section may have perpendicular symmetry on either side of this center plane. The center plane extends beyond either end of the slot and may be used to define the slot orientation relative to the nozzle body inlet flow axis as described below.

Figure 9:
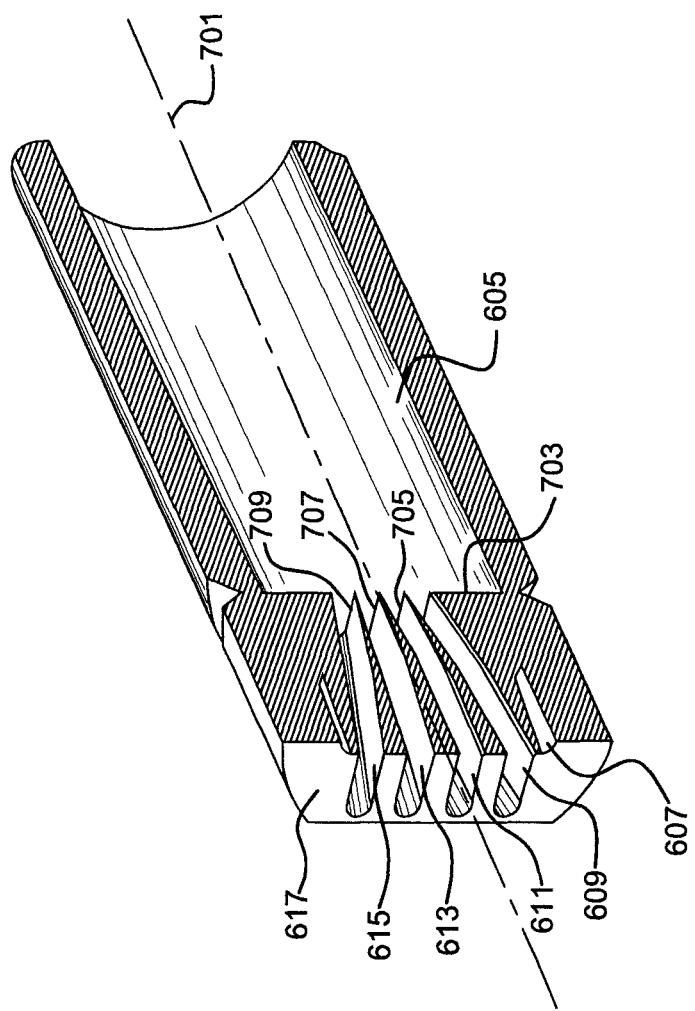
FIG. 9 is a cross-sectional perspective view of axial section I-I of the nozzle of FIG. 8.

Axial section I-I of the nozzle 601 of FIG. 8 is given in FIG. 9. An inlet flow axis 701 passes through the center of the nozzle inlet pipe 605, the inlet face 703, and the outlet face 617. In this embodiment, the center planes of slots 609, 611, 613, and 615 lie at angles to the inlet flow axis 701 such that gas flows from the slots at outlet face 617 in diverging directions from the inlet flow axis 701. The center plane of slot 607 (only a portion of this slot is seen in FIG. 9) also lies at an angle to the inlet flow axis 701. As will be seen later, this exemplary feature can direct the inner gaseous stream from the nozzle outlet face 617 in another diverging direction from the inlet flow axis 701. In this exemplary embodiment, when viewed in a direction perpendicular to the axial section of FIG. 9, slots 609 and 611 intersect at the inlet face 703 to form sharp edge 705, slots 611 and 613 intersect to form sharp edge 707, and slots 613 and 615 intersect to from sharp edge 709. These sharp edges provide aerodynamic flow separation to the slots and reduce pressure drop associated with bluff bodies. Alternatively, these slots may intersect at an axial location between the inlet face 703 and the outlet face 617, and the sharp edges would be formed within the nozzle body 603. Alternatively, these slots may not intersect when viewed in a direction perpendicular to the axial section of FIG. 9, and no sharp edges would be formed.

The term "inlet flow axis" as used herein is an axis defined by the flow direction of fluid entering the HSF nozzle at the inlet face, wherein this axis passes through the inlet and outlet faces. Typically, but not in all cases, the inlet flow axis is perpendicular to the center of the nozzle inlet face 703 and/or the outlet nozzle face 617, and meets the faces perpendicularly. When the nozzle inlet pipe 605 is a typical cylindrical conduit as shown, the inlet flow axis may be parallel to or coincident with the conduit axis.

The axial slot length is defined as the length of a slot between the nozzle inlet face and the nozzle outlet face, for example, between the inlet face 703 and the outlet face 617 of FIG. 9. The slot height is defined as the perpendicular distance between the slot walls at the minor cross-section axis. The ratio of the axial slot length to the slot height may be between about 1 and about 20.

The multiple slots in a nozzle body may intersect in a plane perpendicular to the inlet flow axis. As shown in FIG. 8, for example, the cross slots 609, 611, 613, and 615 intersect the central slot 607 at right angles. If desired, these slots may intersect in a plane perpendicular to the inlet flow axis at angles other than right angles. Adjacent slots also may intersect when viewed in a plane parallel to the inlet flow axis, i.e., the section plane of FIG. 9. As shown in FIG. 9, for example, the slots 609 and 611 intersect at the inlet face 703 to form the sharp edge 705 as earlier described. The angular relationships among the center planes of the slots, and also between the center plane of each slot and the inlet flow axis, may be varied as desired. This allows the inner gas stream to be discharged from the nozzle in any selected direction relative to the nozzle axis.

Figure 10A:
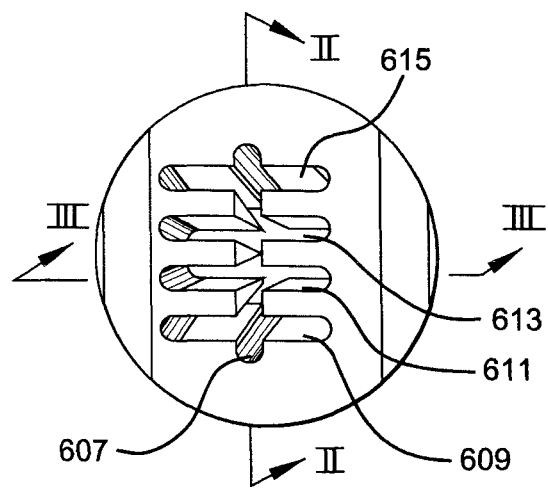
FIG. 10A is a front view of the nozzle body of FIG. 8 showing the discharge end or nozzle of the nozzle body.
Figure 10C:
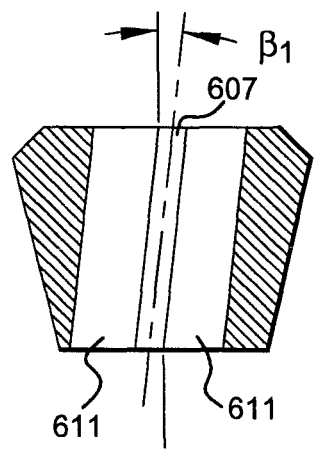
FIG. 10C is a cross-sectional view of section of FIG. 10A.
Figure 10B:
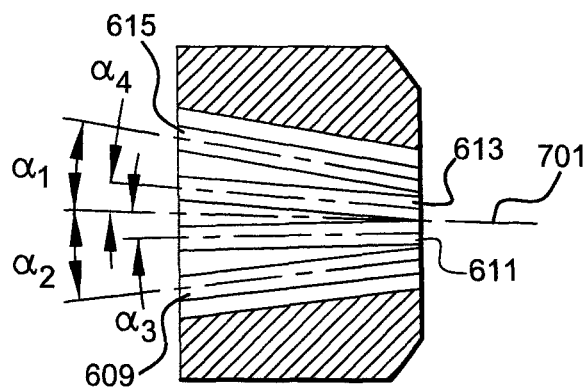
FIG. 10B is a cross-sectional view of section II-II of FIG. 10A.

Additional views of an exemplary nozzle body 603 are given in FIGS. 10A to 10D. FIG. 10A is a front perspective view of the nozzle body; FIG. 10B is a view of section II-II of FIG. 10A and illustrates the angles formed between the center planes of the slots and the inlet flow axis. Angle $\alpha_1$ is formed between the center plane of slot 615 and inlet flow axis 701 and angle $\alpha_2$ is formed between the center plane of slot 609 and inlet flow axis 701. Angles $\alpha_1$ and $\alpha_2$ may be the same or different, and may be in the range of 0 to about 30 degrees. Angle $\alpha_3$ is formed between the center plane of slot 611 and inlet flow axis 701 and angle $\alpha_4$ is formed between the center plane of slot 613 and inlet flow axis 701. Angles $\alpha_3$ and $\alpha_4$ may be the same or different, and may be in the range of 0 to about 30 degrees. The center planes of any two adjacent other slots may intersect at an included angle of between 0 and about 15 degrees.

FIG. 10C is a view of section III-III of FIG. 10A which illustrates the angle $\beta_1$ formed between the center plane of slot 607 and inlet flow axis 701. Angle $\beta_1$ may be in the range of 0 to about 30 degrees. The outer edges of slot 611 (as well as slots 609, 613, and 615) may be parallel to the center plane of slot 607.

Figure 10D:
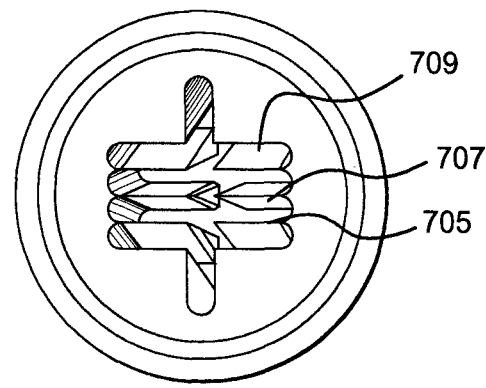
FIG. 10D is a rear view of the nozzle body of FIG. 8 showing the inlet end of the nozzle body.

FIG. 10D is a rear perspective drawing of the nozzle body of FIGS. 7 and 8 which gives another view of sharp edges 705, 707, and 709 formed by the intersections of slots 609, 611, 613, and 615.

Figure 11:
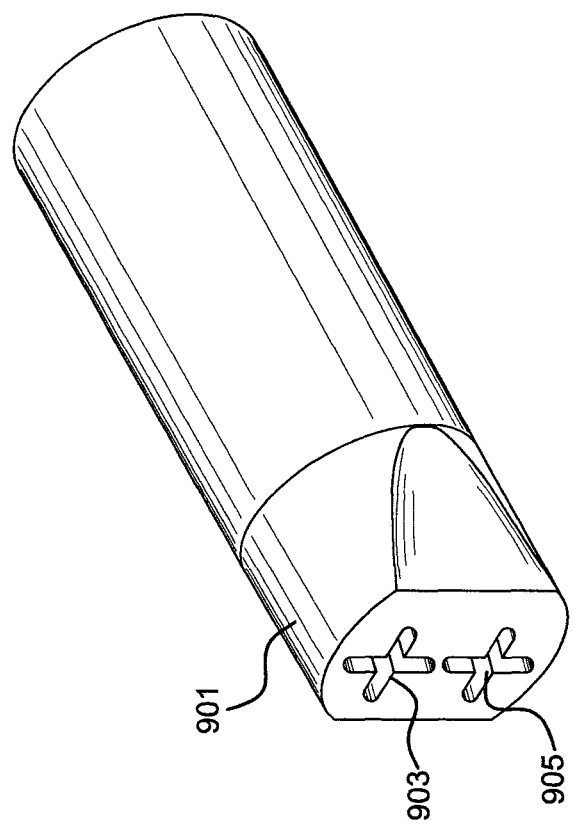
FIG. 11 is a perspective view of an alternative high shape factor nozzle assembly for use in a rapid energy release burner.

Another type of nozzle is illustrated in FIG. 11 in which the slots in nozzle body 901 are disposed in the form of two crosses 903 and 905. A front perspective view of the nozzle body is shown in FIG. 12A in which cross 903 is formed by slots 1007 and 1009 and cross 905 is formed by slots 1001 and 1013. A view of section IV-IV of FIG. 12A shown in FIG. 12B shows the center planes of slots 1009 and 1011 diverging from inlet flow axis 1015 by angles $\alpha_5$ and $\alpha_6$. Angles $\alpha_5$ and $\alpha_6$ may be the same or different and may be in the range of 0 to about 30 degrees. The outer edges of slot 1007 may be parallel to the center plane of slot 1009 and the outer edges of slot 1013 may be parallel to the center plane of slot 1011. In this embodiment, slots 1007 and 1011 intersect to form sharp edge 1012.

A view of section V-V of FIG. 12A is shown in FIG. 12C, which illustrates how the center plane of slot 1013 diverges from inlet flow axis 1015 by included angle $\beta_2$, which may be in the range of 0 to about 30 degrees. The outer edges of slot 1011 may be parallel to the center plane of slot 1013.

As described above, slots may intersect other slots in either or both of two configurations. First, slots may intersect when seen in a view perpendicular to the nozzle body outlet face (see, for example, FIG. 10A or 12A) or when seen in a slot cross-section (i.e., a section perpendicular to the inlet flow axis between the inlet face and outlet face). Second, adjacent slots may intersect when viewed in a section taken parallel to the inlet flow axis (see, for example, FIGS. 9, 10B, and 12B). An intersection of two slots occurs by definition when a plane tangent to a wall of a slot intersects a plane tangent to a wall of an adjacent slot such that the intersection of the two planes lies between the nozzle inlet face and outlet face, at the inlet face, and/or at the outlet face. For example, in FIG. 9, a plane tangent to a wall of slot 609 intersects a plane tangent to a wall of slot 607 and the intersection of the two planes lies between inlet face 703 and outlet face 617. A plane tangent to upper wall of slot 609 and a plane tangent to the lower wall of slot 611 intersect at edge 705 at inlet face 703. In another example, in FIG. 12B, a plane tangent to the upper wall of slot 1013 and a plane tangent to the lower wall of slot 1007 intersect at edge 1012 between the two faces of the nozzle.

Each of the slots in the exemplary embodiments described above has generally planar and parallel internal walls. Other embodiments are possible in which the planar walls of a slot may converge or diverge relative to one another in the direction of fluid flow. In other embodiments, the slot walls may be curved rather than planar. Each of the slots in the exemplary embodiments described above has a generally rectangular cross-section with straight sides and curved ends.

Both cross- and zipper-shaped nozzles described above provide improved performance compared to traditional circular nozzles in terms of rapid mixing; this improvement is directly related to improved energy release to the furnace as a result of using these exemplary nozzle geometries. Table 2 gives typical ranges of the geometric design parameters for these nozzles which are useful to effect significant mixing of fuel and oxidant streams, which enhances the rapidity of combustion energy release. The design parameters are defined in FIGS. 13 and 14.

TABLE 2

Typical Ranges for Nozzle Design Parameters
(FIGS. 13 and 14)

| Secondary Fuel Nozzle Type | (H) Slot Height, (inch) | (W) Slot Width, (inch) | ($R_o$/R1) Slot end radius to center radius ratio | (H/$R_o$) Slot height to corner radius ratio | ($\alpha$, $\alpha_1$, $\alpha_2$) Axial divergence angle, degrees | ($\beta$) Radial divergence angle, degrees |
|---|---|---|---|---|---|---|
| Cross Nozzle (FIG. 13) | (1/32-1) | (1/4-2) | (1-3) | (2-6) | (0-30) | (0-30) |
| Zipper Nozzle (FIG. 14) | (1/32-1) | (1/4-2) | (1-3) | (2-6) | (0-30) | (0-30) |

Figure 5B:
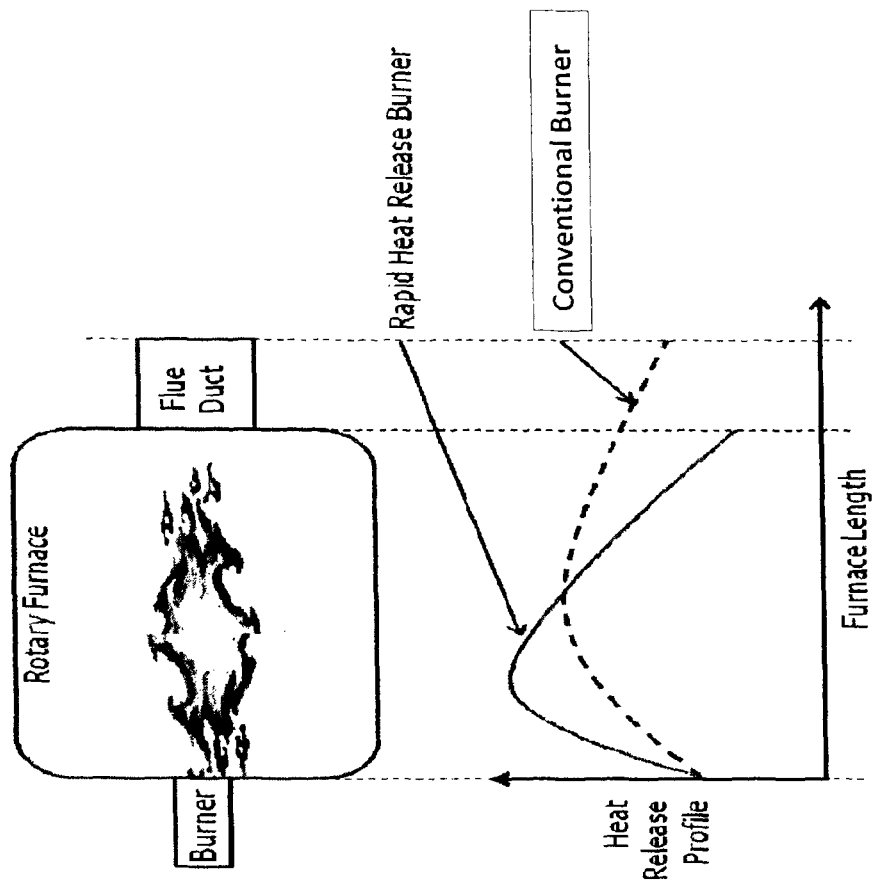
FIG. 5B is a graph, superimposed with a graphic of an exemplary rotary furnace into which a burner is installed, illustrating the heat flux versus length of a conventional burner in comparison to a rapid energy release burner including a high shape factor nozzle surrounded by an annular nozzle.
Figure 6:
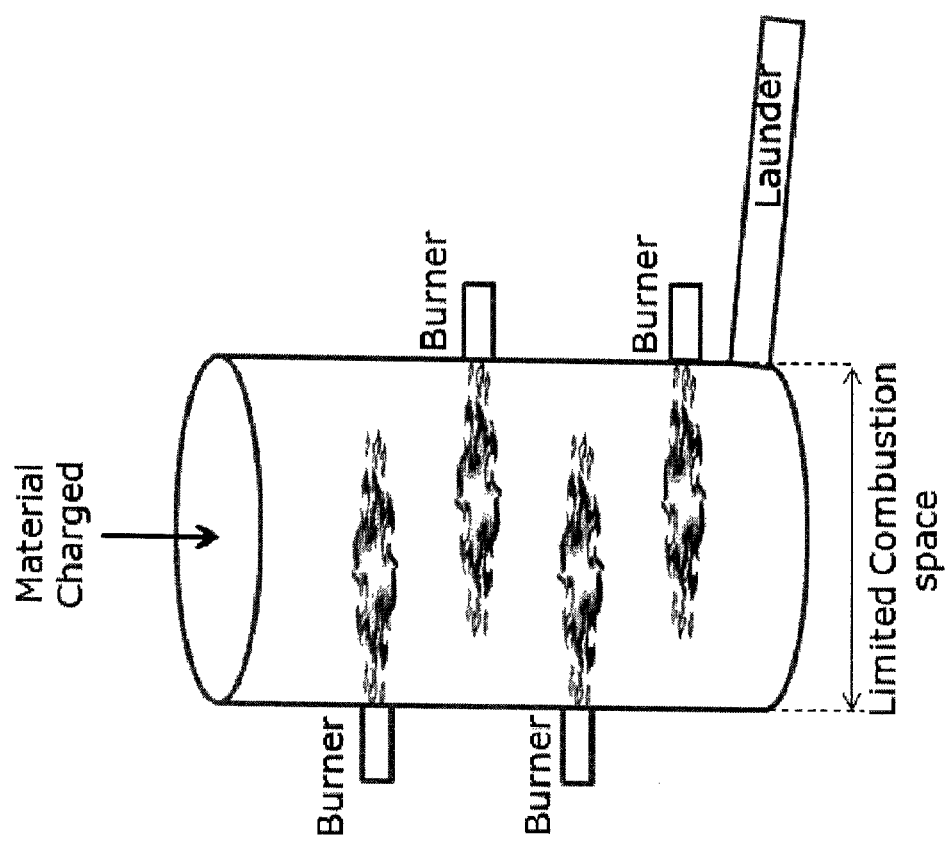
FIG. 6 is a plan view of an exemplary furnace, such as a shaft furnace or cupola, having a large length to width ratio and multiple burners firing laterally along the width of the furnace with limited combustion space.

The benefits of a rapid release burner can be realized particularly when the combustion time or space is limited, for example in single-pass furnaces (FIG. 5B), in processes where scrap is located very close to the burner outlet, and in furnaces with large aspect ratios, where burners are fired along the width of the furnace, such as shaft furnaces and cupolas (FIG. 6).

Figures 4A, 4B:
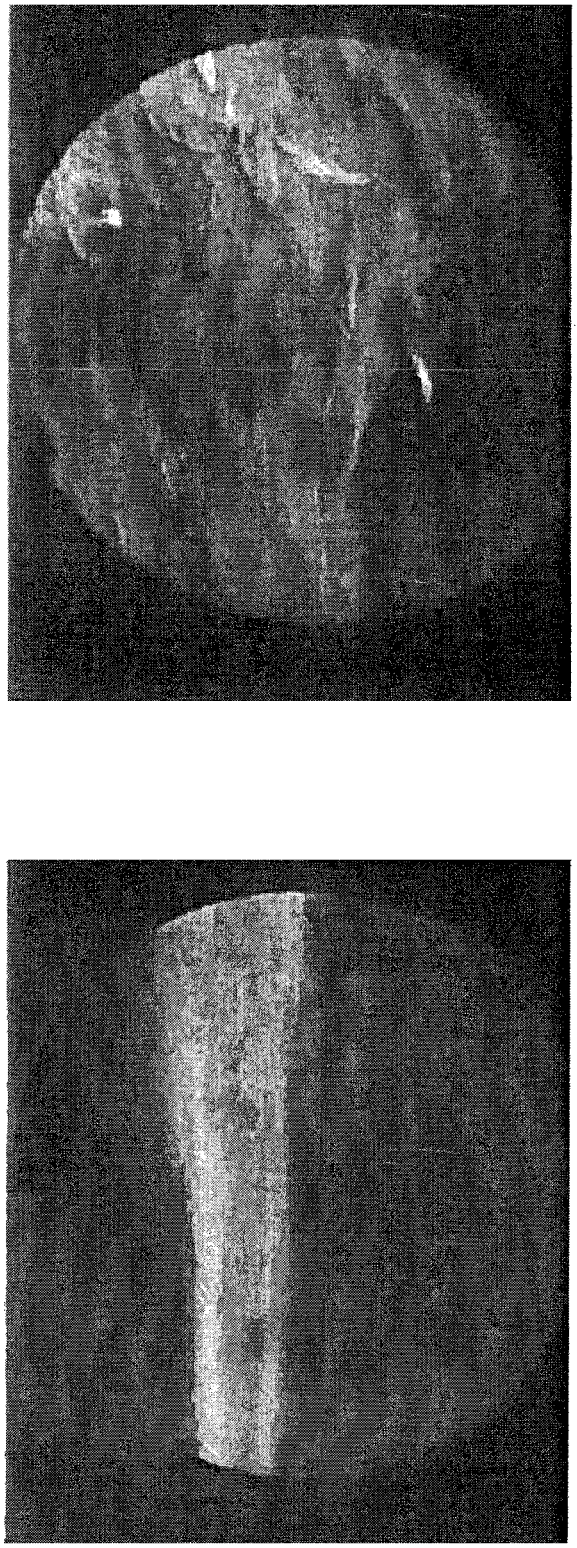
FIGS. 4A and 4B are photographs comparing a flame from a conventional burner (FIG. 4A) to a flame formed by a burner including a high shape factor nozzle surrounded by an annular nozzle as described herein (FIG. 4B).

An exemplary rapid energy release burner, as shown in FIGS. 1-3B, was operated in a test furnace to obtain a comparison between the rapid energy release burner and a conventional pipe-in-pipe type oxy-fuel burner shown in FIG. 21.4 of the previously identified Industrial Burners Handbook. A photographic comparison of the flame shape of the conventional burner (FIG. 4A) and the rapid energy release burner (FIG. 4B) was conducted via photographs taken through a circular window located close to the burner exit. In this case, fuel (natural gas) was provided to the HSF nozzle and oxidizer (oxygen) was provided to the annular nozzle. The directions of fuel flow (natural gas) and oxidizer (oxygen) flow, and thus the flame orientation, are indicated in the figures. FIG. 4B clearly shows a much bushier and voluminous flame near the burner exit as compared with FIG. 4A. Without wishing to be bound by any theory or explanation, it is apparent that the rapid mixing of natural gas and (in this case) oxygen just outside the burner exit results in the flame being relatively voluminous in comparison to that obtained by the conventional oxy-fuel burner.

Because of effective mixing induced by the rapid energy release nozzle arrangement, the energy release profile along the length of the furnace becomes more concentrated and can be controlled to achieve a desired heat flux. FIG. 5A shows a comparison between the heat flux profiles obtained from the conventional oxy-fuel and rapid energy release burners in the test furnace. FIG. 5A illustrates that the rapid energy release burner can achieve a heat flux profile that is provides a peak heat flux closer to the burner exit than a conventional burner, and that provides a larger integrated heat flux within the first six feet of the burner exit than a conventional burner. Also, more rapid energy release may allow shortening of the furnace, may result in lower flue gas temperatures, and may allow lower firing rates (and thus provide fuel savings) to achieve the same net het flux.

Figure 5A:
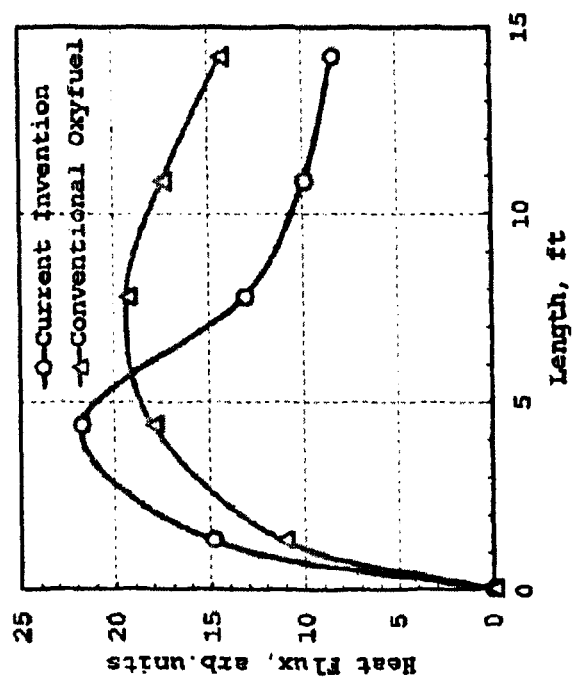
FIG. 5A is a graph of heat flux versus furnace length in a test furnace, comparing the heat release profile of a rapid energy release burner to a conventional pipe-in-pipe oxy-fuel burner.

An exemplary rapid release burner, as shown in FIGS. 1-3B, was also installed in two single-pass rotary type furnaces for melting a metal charge, which are schematically depicted in the upper portion of FIG. 5B. When these furnaces were operated with a different (conventional) oxy-fuel burner, the flue gas duct refractory required frequent repair, a problem that was attributed to incomplete combustion within the confines of the furnace and overheating of the flue gas duct. But when the same furnaces were operated with a rapid energy release burner, the flue gas duct operated at lower temperatures and the metal was tapped out at higher temperatures using the burner same firing rates as with the conventional burner. A representative graph of heat flux is provided in FIG. 5B, showing a higher integrated heat flux within the furnace and a lower heat flux by the time the combustion gases reach the flue gas duct. In other words, the rapid energy release burner was able to release more combustion energy within the furnace confines as a result of rapid mixing than the conventional burner system in which the fuel and oxidizing gases continued to combust and release energy into the flue gas duct. Therefore, not only was the rapid energy release burner able to reduce damage to the flue gas duct refractory, but fuel usage was able to be reduced by about 10%, and oxygen usage by about 10% to about 15%, while still achieving the same net heat flux to the metal within the furnace.

It has been determined that a predetermined heat flux profile can be achieved by using the rapid energy release burner by varying the high shape factor nozzle shapes and arrangements, and by controlling nozzle velocity and velocity ratios. In that way, the flame volume and release of energy can be tailored to particular applications and furnaces.

Note that in the exemplary embodiments described above, fuel was provided in the HSF nozzle and oxidant was provided in the annular nozzle. However, if desired, the flow of fuel and oxidant can be reversed, and similar beneficial results are expected.

The rapid energy release burner can be used in a wide range of applications wherein it is desired to have a voluminous flame, and defined heat flux and energy release. For example, the burner including an HSF nozzle surrounded by an annular nozzle can be used in all applications related to melting and reheating of metals (e.g., aluminum, iron & steel, copper, lead, zinc, among other materials) including heating in rotary furnaces, reverberatory furnaces, soaking pits, and shaft furnaces, as well as other furnaces. In one aspect, the rapid energy release burner can be employed in applications that involve non-uniform (or lopsided) loading of metal scrap or parts (such as ingots and blooms) into the furnace.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A burner comprising:
 a high shape factor nozzle including a nozzle body and nozzle opening having a shape factor from about 10 to about 75, the shape factor being defined as the square of the nozzle perimeter divided by twice the nozzle cross-sectional area; and
 an annular nozzle surrounding the high shape factor nozzle, wherein an annular nozzle opening is formed between the annular nozzle and the high shape factor nozzle;
 wherein the high shape factor nozzle is configured to be supplied with one of a fuel gas and an oxidizer gas, and the annular nozzle is configured to be supplied with the other of a fuel gas and an oxidizer gas; and
 wherein the high shape factor nozzle opening and the annular nozzle opening are sized so as to provide a velocity ratio of a gas stream flowing through the annular nozzle to a gas stream flowing through the high shape factor nozzle opening, $V_{ANNULAR}/V_{HSF}$, from about 0.05 to about 0.9.

2. The burner of claim 1, wherein the high shape factor nozzle body tapers narrower toward the nozzle opening, the nozzle body having two tapered faces that at an angle of about 15° to about 30° with respect to an axis of the burner.

3. The burner of claim 2, wherein the high shape factor nozzle has a cross-sectional area and an outlet face with an area from about 35% to about 70% of the cross-sectional area.

4. The burner of claim 1, wherein the annular nozzle has a discharge end, and wherein the nozzle opening of the high shape factor nozzle is axially offset from the discharge end.

5. The burner of claim 4, wherein the high shape factor nozzle has a diameter, and wherein the nozzle opening of the high shape factor nozzle is recessed from the discharge end by less than or equal to about one high shape factor nozzle diameter.

6. The burner of claim 1, wherein the high shape factor nozzle is positioned centrally within the annular nozzle opening.

7. The burner of claim 1, wherein the high shape factor nozzle is offset from a central position within the annular nozzle opening.

8. The burner of claim 1, comprising a plurality of high shape factor nozzles positioned within the annular nozzle opening.

9. A burner comprising:
a high shape factor nozzle including a nozzle body, an outlet face, and a nozzle opening in the outlet face having a shape factor from about 10 to about 75, the shape factor being defined as the square of the nozzle perimeter divided by twice the nozzle cross-sectional area; and
an annular nozzle surrounding the high shape factor nozzle and having a discharge end;
wherein the high shape factor nozzle is configured to be supplied with one of a fuel gas and an oxidizer gas, and the annular nozzle is configured to be supplied with the other of a fuel gas and an oxidizer gas;
wherein the outlet face of the high shape factor nozzle is offset by an offset distance with respect to the discharge end of the annular nozzle;
wherein the high shape factor nozzle has a center plane extending outward from the outlet face; and
wherein the outer wall of the high shape factor nozzle body has two opposed faces that taper inward toward the center plane, such that protections of the opposed faces and the center plane would intersect at a line beyond the outlet face of the high shape factor nozzle.

10. The burner of claim 9, wherein the angle of taper is about 15° to about 30°.

11. The burner of claim 10, wherein the high shape factor nozzle has a cross-sectional area and an outlet face with an area from about 35% to about 70% of the cross-sectional area.

12. The burner of claim 9, wherein the high shape factor nozzle has a diameter, and wherein the nozzle opening of the high shape factor nozzle is recessed from the discharge end by less than or equal to about one high shape factor nozzle diameter.

13. The burner of claim 9, wherein the ratio of the cross-sectional area of the high shape factor nozzle to the cross-sectional area of the annular nozzle is sized so as to provide a velocity ratio of a gas stream flowing through the annular nozzle opening to a gas stream flowing through the high shape factor nozzle opening, $V_{ANNULAR}/V_{HSF}$, of less about 1.

14. The burner of claim 13, wherein the ratio of cross-sectional areas is sized to provide a velocity ratio $V_{ANNULAR}/V_{HSF}$ of about 0.3.

15. A method of rapid energy release combustion, comprising:
supplying a fuel gas and an oxidizer gas to a burner having a high shape factor nozzle and an annular nozzle surrounding the high shape factor nozzle;
directing one of the fuel gas and the oxidizer gas through the high shape factor nozzle;
directing the other of the fuel gas and the oxidizer gas through the annular nozzle; and
causing the ratio of the velocity of the gas flowing through the annular nozzle opening to the velocity of the gas flowing through the high shape factor nozzle opening, $V_{ANNULAR}/V_{HSF}$, to be from about 0.05 to about 0.9;
wherein the high shape factor nozzle includes nozzle opening having a shape factor from about 10 to about 75, the shape factor being defined as the square of the nozzle perimeter divided by twice the nozzle cross-sectional area.

16. The method of claim 13, wherein the ratio of the velocities, $V_{ANNULAR}/V_{HSF}$, is about 0.3.

17. The method of claim 15, wherein the annular nozzle has a discharge end, wherein the high shape factor nozzle has a diameter, and wherein the nozzle opening of the high shape factor nozzle is recessed from the discharge end by less than or equal to about one high shape factor nozzle diameter.

18. The method of claim 15,
wherein the high shape factor nozzle tapers narrower toward the nozzle opening, the nozzle body having two tapered faces that at an angle of about 15° to about 30° with respect to an axis of the burner, and
wherein the high shape factor nozzle has a cross-sectional area and an outlet face with an area from about 35% to about 70% of the cross-sectional area.

19. The method of claim 15, wherein the fuel gas and oxidizer gas combine to create a voluminous flame for melting at least one of aluminum, iron, steel, copper, and zinc in a furnace.

* * * * *